United States Patent
Cavarec et al.

(10) Patent No.: US 11,891,901 B2
(45) Date of Patent: Feb. 6, 2024

(54) VARIABLE-PITCH STATOR VANE FOR AN AIRCRAFT TURBINE ENGINE

(71) Applicant: SAFRAN AIRCRAFT ENGINES, Paris (FR)

(72) Inventors: Mickael Cavarec, Moissy-Cramayel (FR); Sébastien Claude Cochon, Moissy-Cramayel (FR); Pierre-Hugues Ambroise Maxime Victor Retiveau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 17 days.

(21) Appl. No.: 17/598,777

(22) PCT Filed: Apr. 2, 2020

(86) PCT No.: PCT/FR2020/000082
§ 371 (c)(1),
(2) Date: Sep. 27, 2021

(87) PCT Pub. No.: WO2020/201642
PCT Pub. Date: Oct. 8, 2020

(65) Prior Publication Data
US 2022/0162954 A1    May 26, 2022

(30) Foreign Application Priority Data
Apr. 3, 2019 (FR) ...................... 1903535

(51) Int. Cl.
*F01D 17/16* (2006.01)
*F01D 9/04* (2006.01)

(52) U.S. Cl.
CPC ........... *F01D 17/162* (2013.01); *F01D 9/041* (2013.01); *F05D 2220/323* (2013.01); *F05D 2240/122* (2013.01); *F05D 2240/125* (2013.01)

(58) Field of Classification Search
CPC ... F01D 9/02; F01D 9/04; F01D 9/041; F01D 9/042; F01D 17/10; F01D 17/12;
(Continued)

(56) References Cited

U.S. PATENT DOCUMENTS

| 2015/0240648 A1* | 8/2015 | Guemmer | F01D 5/022 416/200 R |
| 2017/0097011 A1* | 4/2017 | Pallot | F04D 19/02 |

(Continued)

FOREIGN PATENT DOCUMENTS

| DE | 10 2014 203 605 A1 | 8/2015 |
| EP | 2 103 783 A2 | 9/2009 |

(Continued)

OTHER PUBLICATIONS

English translation of Written Opinion dated Jun. 9, 2020, issued in corresponding International Application No. PCT/FR2020/000082, filed Apr. 2, 2020, 7 pages.

(Continued)

*Primary Examiner* — Elton K Wong
(74) *Attorney, Agent, or Firm* — CHRISTENSEN O'CONNOR JOHNSON KINDNESS PLLC

(57) ABSTRACT

A variable-pitch stator blade includes an airfoil having a central portion with a first chord and a first skeleton line delimited by a leading edge and a trailing edge. An end portion has a second chord and a second skeleton line delimited by the leading edge and a downstream limit. A skeleton angle at a first length l1 of the first chord is defined by a function G1(l1), and the skeleton angle at a second length l2 of the second rope being chord is defined by a function G2(l2). The absolute value of the average increase A2 of G2'(l2) between the leading edge and the downstream limit is greater than the absolute value of the average increase A1 of G1'(l1) between the leading edge and a point (Continued)

P, wherein the first length l1 corresponds to the total length of the second chord.

9 Claims, 4 Drawing Sheets

(58) Field of Classification Search
CPC ........ F01D 17/14; F01D 17/16; F01D 17/162; F05D 2240/12; F05D 2240/122; F05D 2240/125; F05D 2220/323; F04D 29/54; F04D 29/541; F04D 29/56; F04D 29/563
See application file for complete search history.

(56) References Cited

U.S. PATENT DOCUMENTS

| | | | | |
|---|---|---|---|---|
| 2017/0314406 | A1* | 11/2017 | Wolf | F04D 29/542 |
| 2020/0056486 | A1* | 2/2020 | Schrape | F04D 29/563 |
| 2020/0308974 | A1* | 10/2020 | Hosaka | F04D 29/687 |

FOREIGN PATENT DOCUMENTS

| | | |
|---|---|---|
| EP | 2 236 773 A2 | 10/2010 |
| FR | 3 010 464 A1 | 3/2015 |
| FR | 3 063 102 A1 | 8/2018 |

OTHER PUBLICATIONS

International Preliminary Report on Patentability dated Sep. 28, 2021, issued in corresponding International Application No. PCT/FR2020/000082, filed Apr. 2, 2020, 8 pages.

International Search Report dated Jun. 9, 2020, issued in corresponding International Application No. PCT/FR2020/000082, filed Apr. 2, 2020, 7 pages.

Written Opinion dated Jun. 9, 2020, issued in corresponding International Application No. PCT/FR2020/000082, filed Apr. 2, 2020, 7 pages.

* cited by examiner

VARIABLE-PITCH STATOR VANE FOR AN AIRCRAFT TURBINE ENGINE

FIELD OF THE DISCLOSURE

Embodiments of the present disclosure relate to the general field of the variable-pitch stator vanes for an aircraft turbine engine.

BACKGROUND

Variable-pitch stator vanes (better known by VSV—Variable Stator Vanes) are typically incorporated into a turbine engine compressor, the latter being assembled in one or more annular rows.

The angular setting of the stator vanes allows to adapt the geometry of the compressor to its operating regime, so as to optimise its efficiency and pumping margin.

The vanes of a single row are supported by an outer annular casing. The outer casing defines, together with an inner annular casing, a duct in which an air stream flows.

Each vane is streamlined with respect to a longitudinal axis which is parallel to the longitudinal axis of the turbine engine when the vane is mounted in the compressor. The vane comprises an airfoil blade extending along a vertical axis. A blade thus comprises a plurality of blade sections stacked on top of each other along the vertical axis, the latter being referred to as the "vertical stacking axis". The vane is guided in rotation via an outer pivot which defines the axis of rotation of the vane. The outer pivot is connected to a radially outer end of the blade via a plate. The outer pivot and the plate are respectively housed in a corresponding hole and housing formed in the outer casing. The blade has a larger transverse dimension than the plate, i.e., a downstream portion of the blade is beyond the periphery of the plate. In order to limit disturbance, the inner face of the plate is flush with the inner surface of the outer casing. The vane generally comprises an inner pivot opposite the outer pivot so as to improve its guidance.

The vanes in a row are usually operated in a synchronised manner by a control ring that rotates around the outer casing. Each vane is connected to the ring via a linkage, one end of which is coupled in rotation to the outer pivot and the other end is hinged with respect to the ring. The rotational movement of the ring is initiated by one or more actuators.

Each blade has a central portion disposed vertically between an outer end portion and an inner end portion. The blade comprises a common leading edge over its entire height (expressed along the vertical stacking axis).

The three portions of the blade are streamlined along a skeleton line (or average line) that varies progressively along the vertical stacking axis. The blade thus has a curvature that evolves progressively over its entire height. Unlike the central portion, the outer and inner end portions are truncated (or trimmed) downstream over a predefined height, i.e. the profile of a section of these portions gradually flares out from the leading edge and abruptly stops at a straight limit substantially perpendicular to the skeleton line (hereinafter referred to as the "downstream limit"), so as to leave a radial operating clearance between the central portion and the corresponding casings. The downstream limits are thus located within the space defined by the periphery of the plate. The profile of a section of the central portion diverges from the leading edge and then converges towards a trailing edge.

The blade allows the air stream to be directed in a predetermined direction. It is easy to understand that the direction of the air stream at the downstream limits (end portions) does not correspond to the predetermined direction, due to the shortening of the blade.

The misdirection of the air stream at the end portions negatively impacts the efficiency of the compressor. In addition, this misdirection of the air stream has a negative effect on the impeller directly downstream of the VSV vane row, at the expense of the compressor efficiency again.

The objective of the present disclosure is thus to provide an optimised variable-pitch stator vane to overcome the aforementioned drawbacks.

SUMMARY

Embodiments of the disclosure thus proposes a variable-pitch stator vane for an aircraft turbine engine, the vane being streamlined with respect to a longitudinal axis X, the vane comprising an airfoil blade extending along a vertical stacking axis E and having a common leading edge, the blade comprising:
  a central portion having in section a first skeleton line delimited transversely by the leading edge and a trailing edge, and a first chord connecting the leading edge to the trailing edge,
  a first end portion vertically delimiting the central portion, the first end portion having in section a second skeleton line transversely delimited by the leading edge and a first downstream limit, and a second chord connecting the leading edge to the first downstream limit, the total length of the second chord being between 40 and 80% of the total length of the first chord,
  a first junction between the central portion and the first end portion,
characterised in that the skeleton angle α at a length l1 of the first chord in a section of the central portion is defined by a function G1($l1$) and the skeleton angle α at a length l2 of the second chord in a section of the first end portion is defined by a function G2($l2$), the skeleton angle α corresponding in section to the angle formed between the tangent T to the corresponding skeleton line at the point considered and the longitudinal axis X, the derivative function from the function G1($l1$) with respect to the length l1 being denoted G1'(($l1$)), the derivative function from the function G2($l2$) with respect to the length l2 being denoted G2'($l2$), the absolute value of the average increment A2 of G2'($l2$) between the leading edge and the first downstream limit is greater than the absolute value of the average increment A1 of G1'($l1$) between the leading edge and a point P where the length l1 corresponds to the total length of the second chord, the average increment of a function f between a point A (a, f(a)) and a point B (b, f(b)) corresponding by definition to the quotient of the difference f(b)−f(a) by the difference b−a.

By definition in the present application, the expression "in section" associated with an element refers to the representation of a section of this element according to a cross-sectional plane, and in other words according to a sectional plane perpendicular to the vertical stacking axis E.

Compared to the prior art, the dimensioning of the blade according to the disclosure significantly increases the curvature of the first end portion, so as to obtain a continuity of the skeleton angle between the trailing edge (central portion) and the first downstream limit (first end portion), and thus orient the air stream according to the predetermined direction over the entire height of the blade (expressed along the vertical stacking axis).

Such a dimensioning of the blade thus allows to significantly increase the efficiency of the device in which the latter is mounted, for example a turbine engine compressor.

The vane according to the disclosure may comprise one or more of the following features and/or steps, taken in isolation from each other or in combination with each other:

- the skeleton angle α at the trailing edge of the central portion in the vicinity of the first junction is substantially equal to the skeleton angle α of the first downstream limit of the first end portion in the vicinity of the first junction, the skeleton angle α corresponding in section to the angle formed between the tangent T to the corresponding skeleton line at the point considered and the longitudinal axis X;
- the skeleton angle α at the trailing edge in the vicinity of the first junction is equal, plus or minus 5 degrees, to the skeleton angle α of the first downstream limit in the vicinity of the first junction;
- the skeleton angle α at the trailing edge over a predetermined interval is equal, plus or minus five degrees, to the skeleton angle α of the first downstream limit over the predetermined interval, the predetermined interval being centred on the first junction and having a vertical dimension corresponding to 5% of the total height H of the blade, the height of the blade being expressed along the vertical stacking axis E;
- the height of the first end portion is 0.2 to 5% of the total height of the blade, the height being expressed along the vertical stacking axis E;
- the blade comprises a second end portion such that the central portion is disposed vertically between the first end portion and the second end portion, the second end portion having in section a third skeleton line delimited transversely by the leading edge and a second downstream limit, and a third chord connecting the leading edge to the second downstream limit, the total length of the third chord being between 40 and 80% of the total length of the first chord, the blade comprising a second junction between the central portion and the second end portion, the skeleton angle α at the trailing edge of the central portion in the vicinity of the second junction being substantially equal to the skeleton angle α of the second downstream limit of the second end portion in the vicinity of the second junction;
- the height of the second end portion is 0.2 to 5% of the total height of the blade.

The present disclosure further relates to a compressor for an aircraft turbine engine comprising a vane as previously described.

The present disclosure also relates to an aircraft turbine engine comprising a compressor as described above or a vane as described above.

DESCRIPTION OF THE DRAWINGS

The disclosure will be better understood and other details, features and advantages of the disclosure will become clearer from the following description made by way of non-limiting example and with reference to the attached drawings in which.

DETAILED DESCRIPTION

Figure 1:
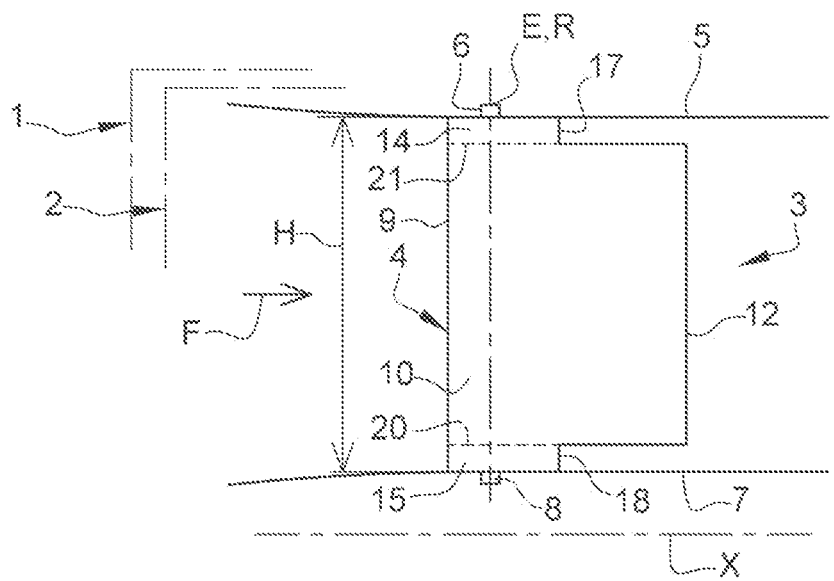
FIG. 1 is a schematic longitudinal half-section view of a compressor for an aircraft turbine engine comprising a variable-pitch stator vane according to the disclosure.

FIG. 1 shows schematically in longitudinal half-section a turbine engine 1 comprising a compressor 2 comprising an annular row of variable-pitch stator vanes 3, better known by the acronym VSV for "Variable Stator Vanes". For the sake of clarity, a single VSV vane 3 (hereinafter referred to as "vane") is shown in FIG. 1. Such a row of vanes 3 is, for example, arranged directly downstream of an impeller.

Each vane 3 is streamlined with respect to a longitudinal axis X which is parallel to the longitudinal axis of the turbine engine 1 when the vane 3 is mounted in the compressor 2. The vane 3 comprises an airfoil blade 4 extending along a vertical stacking axis E. As such, the blade 4 comprises a plurality of blade sections stacked on top of each other along the vertical stacking axis E.

By convention in the present application, the terms "inner", "outer", "inside" or "outside" are defined with respect to the longitudinal axis of the turbine engine 1.

Each vane 3 is guided in rotation with respect to an outer annular casing 5 via an outer pivot 6 and with respect to an inner annular casing 7 via an inner pivot 8. The inner and outer pivots 6, 8 are coaxial and define the axis of rotation R of the vane 3. The axis of rotation R of the vane 3 is here coincident with the vertical stacking axis E. The inner and outer casings 5, 7 are coaxial and define between them an annular duct in which an air stream F circulates.

In the present application, the terms "upstream" and "downstream" are defined in relation to the direction of flow of the air stream around the blade 4.

Each vane 3 is movable about its axis of rotation R between a first extreme position called "opening" in which the pitch angle of each of the vanes 3 is equal to θ1 so as to maximise the air passage section, and a second extreme position called "closing" in which the pitch angle of each of the vanes 3 is equal to θ2 (with θ2 smaller than θ1) so as to minimise the air passage section. The pitch angle of a vane 3 corresponds to the angle, in a longitudinal plane perpendicular to the axis of rotation R of the vane 3, between the chord of the blade 4 (here the central portion of the blade is taken as a reference) and the plane of rotation of the vane 3 (plane perpendicular to the longitudinal axis X and which passes through the axis of rotation R).

The blade 4 of each vane 3 has a common leading edge 9. The blade 4 comprises several portions 10, 14, 15, namely:

- a central portion 10 having in section a first skeleton line 11 delimited transversely by the leading edge 9 and a trailing edge 12, and a first chord 13 connecting the leading edge 9 to the trailing edge 12 (FIGS. 1 and 2);
- a first end portion 14, 15 vertically delimiting the central portion 10, the first end portion 14, 15 having in section a second skeleton line 16, 28 transversely delimited by the leading edge 9 and a first downstream limit 17, 18, and a second chord 19, 29 connecting the leading edge 9 to the first downstream limit 17, 18, the total length L2 of the second chord 19, 29 being between 40 and 80% of the total length L1 of the first chord 13 (FIGS. 1, 4 and 5);
- a junction 20, 21 between the central portion 10 and the first end portion 14, 15.

Advantageously, the skeleton angle α at the trailing edge 12 of the central portion 10 in the vicinity of the junction 20, 21 is substantially equal to the skeleton angle α of the first downstream limit 17, 18 of the first end portion 14, 15 in the vicinity of the junction 20, 21. The skeleton angle α corresponds in section to the angle formed between the tangent T to the corresponding skeleton line at the point considered and the longitudinal axis X.

By definition in the present application, the expression "in section" associated with an element refers to the representation of a section of this element according to a cross-sectional plane, and in other words according to a sectional plane perpendicular to the vertical stacking axis E.

For the purposes of the disclosure, the expression "substantially equal" corresponds more precisely to an interval (or range) of plus or minus 5 degrees. In other words, in the vicinity of the junction 20, 21, the skeleton angle α at the trailing edge 12 is equal, plus or minus 5 degrees, to the skeleton angle α of the first downstream limit 17, 18.

For the purposes of the disclosure, the term "in the vicinity of the junction" refers more precisely to an interval (or range) centred on the junction whose vertical dimension corresponds to 5% of the total height H of the blade 4.

Figure 3:
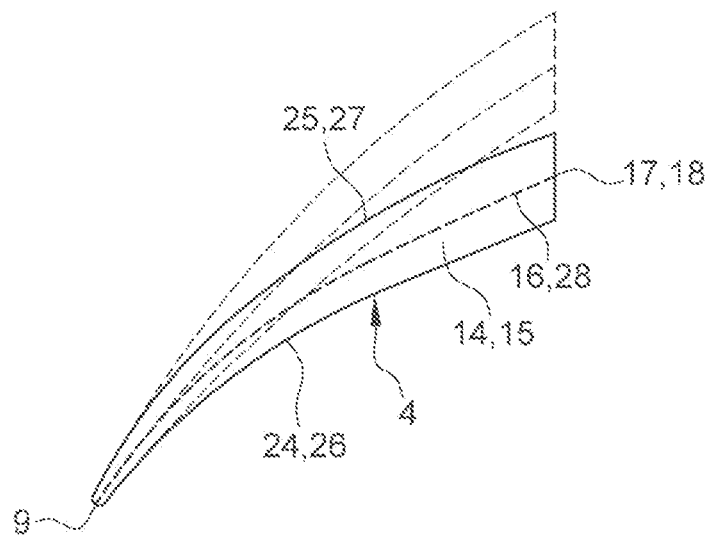
FIG. 3 is a view in which a section of the vane shown in FIG. 1 at an end portion of the blade and a section of the vane according to the prior art are superimposed.

FIG. 3 illustrates, at equal height, the profile of the section of the end portion of the prior art (dashed lines) and the profile of the section of the end portion 14, 15 according to the disclosure (in continuous lines).

Compared to the prior art, the dimensioning of the blade 4 according to the disclosure significantly increases the curvature of the first end portion 14, 15, so as to obtain a continuity of the skeleton angle between the trailing edge 12 (central portion 10) and the first downstream limit 17, 18 (first end portion 14, 15).

At the scale of the blade 4, the dimensioning according to the disclosure imposes a significant variation of the curvature between the central portion 10 (identical with respect to the prior art) and the first end portion 14, 15.

According to the embodiment illustrated in the figures, the central portion 10 is vertically disposed between an outer end portion 14 and an inner end portion 15. The blade 4 further comprises an inner junction 20 between the inner end portion 15 and the central portion 10 and an outer junction 21 between the central portion 10 and the outer end portion 14.

As shown in FIG. 1, H is the total height of the blade 4 along the vertical stacking axis E from the inner end portion 15 to the outer end portion 14.

Figure 2:
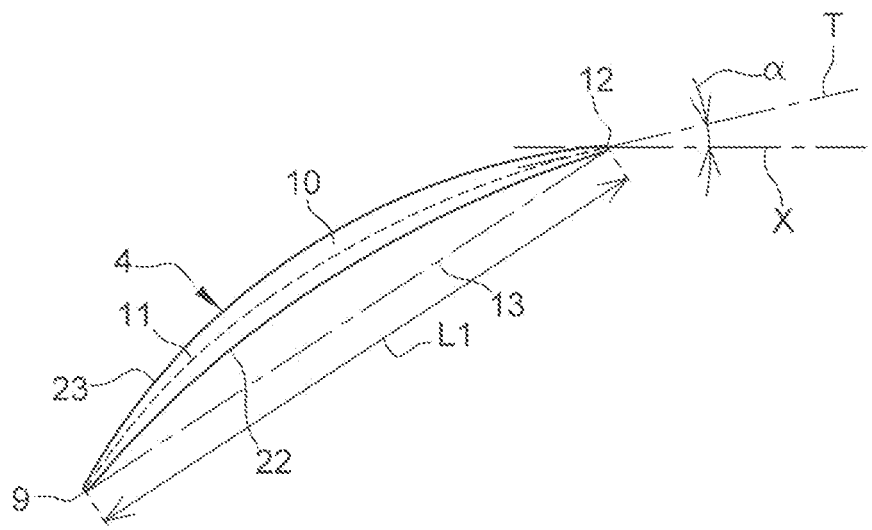
FIG. 2 is a section of the vane shown in FIG. 1 at a central portion of the blade of the vane.

As illustrated in FIGS. 1 and 2, the central portion 10 of the blade 4 has a pressure side surface 22 and a suction side surface 23 connected to each other by the leading edge 9 and the trailing edge 12. The pressure side and suction side surfaces 22, 23 are curved, and concave and convex respectively. The profile of a section of the central portion 10 diverges from the leading edge 9 and then converges towards the trailing edge 12.

More specifically, the profile of a section of the central portion 10 is defined by the first skeleton line 11. The first skeleton line 11 is arranged equidistant between the pressure side surface 22 and the suction side surface 23. The first skeleton line 11 is transversely delimited by the leading edge 9 and the trailing edge 12. The segment connecting the leading edge 9 to the trailing edge 12 corresponds to the first chord 13. The total length of the first chord 13 is denoted L1.

Figure 4:
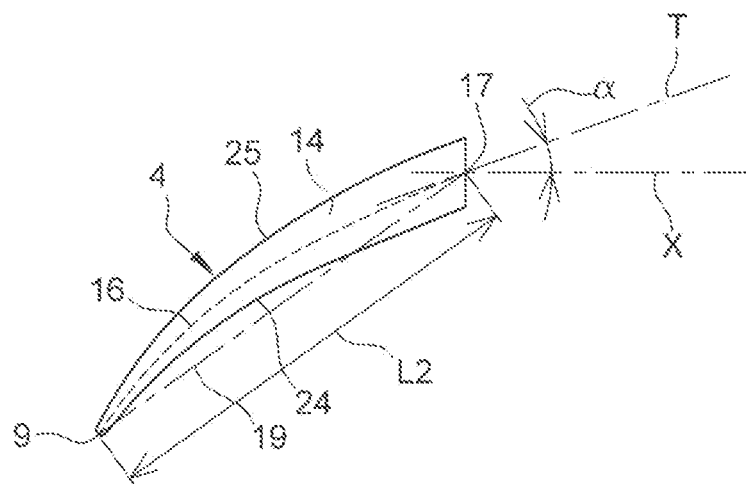
FIG. 4 is a section of the vane shown in FIG. 1 at an outer end portion of the blade.

As illustrated in FIGS. 1 and 4, the outer end portion 14 of the blade 4 has a pressure side face 24 and a suction side face 25 connected to each other by the leading edge 9 and an outer downstream limit 17. The pressure side and suction side faces 24, 25 are curved, and concave and convex respectively. The profile of a section of the outer end portion 14 diverges from the leading edge 9 and then abruptly stops at the outer downstream limit 17.

More specifically, the profile of a section of the outer end portion 14 is defined by the second skeleton line 16. The second skeleton line 16 is arranged equidistant between the pressure side face 24 and the suction side face 25. The second skeleton line 16 is transversely delimited by the leading edge 9 and the outer downstream limit 17. The segment connecting the leading edge 9 to the outer downstream limit 17 corresponds to the second chord 19. The outer downstream limit 17 is straight and substantially perpendicular to the second skeleton line 16.

The total length of the second chord 19 is denoted as L2. The total length L2 of the second chord 19 is between 40 and 80% of the total length L1 of the first chord 13.

Advantageously, the height of the outer end portion 14 is 0.2 to 5% of the total height H of the blade 4.

Advantageously, the skeleton angle α at the trailing edge 12 over a predetermined interval is equal to, plus or minus five degrees, the skeleton angle α of the outer downstream limit 17 over the predetermined interval. The predetermined interval is centred on the outer junction 21. The predetermined interval has a vertical dimension corresponding to 5% of the total height H of the blade 4.

Figure 5:
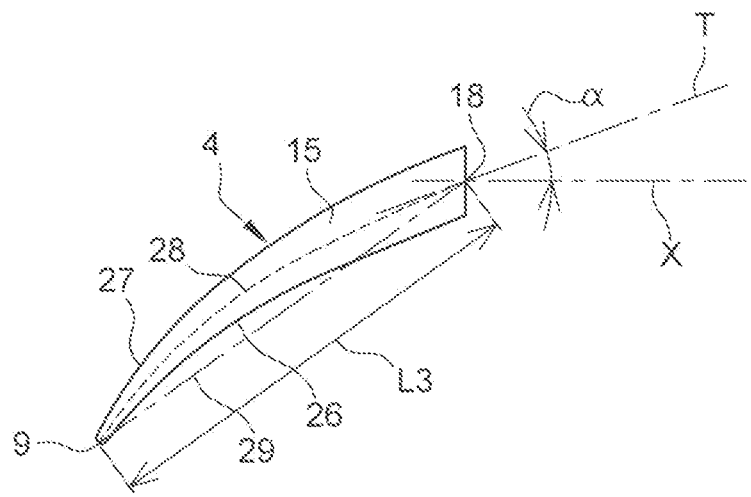
FIG. 5 is a section of the vane shown in FIG. 1 at an inner end portion of the blade.

As illustrated in FIGS. 1 and 5, the inner end portion 15 of the blade 4 has a pressure side face 26 and a suction side face 27 connected to each other by the leading edge 9 and an inner downstream limit 18. The pressure side and suction side faces 26, 27 are curved, and concave and convex respectively. The profile of a section of the inner end portion 15 diverges from the leading edge 9 and then abruptly stops at the inner downstream limit 18.

More specifically, the profile of a section of the inner end portion 15 is defined by the third skeleton line 28. The third skeleton line 28 is disposed equidistant between the pressure side face 26 and the suction side face 27. The third skeleton line 28 is transversely delimited by the leading edge 9 and the inner downstream limit 18. The segment connecting the leading edge 9 to the inner downstream limit 18 corresponds to the third chord 29. The inner downstream limit 18 is straight and substantially perpendicular to the third skeleton line 28.

The total length of the third chord 29 is denoted as L3. The total length L3 of the third chord 29 is between 40 and 80% of the total length L1 of the first chord 13. The total length L3 of the third chord 29 is here equal to the total length L2 of the second chord 19.

Advantageously, the height of the inner end portion 15 is 0.2 to 5% of the total height H of the blade 4.

Advantageously, the skeleton angle α at the trailing edge 12 over a predetermined interval is equal, plus or minus five degrees, to the skeleton angle α of the inner downstream limit 18 over the predetermined interval. The predetermined interval is centred on the inner junction 20. The predetermined interval has a vertical dimension corresponding to 5% of the total height H of the blade 4.

Figure 6:
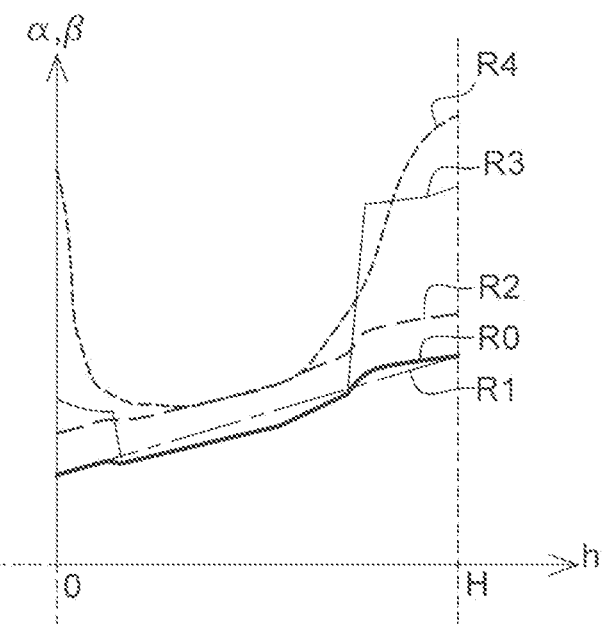
FIG. 6 is a graph showing a curve R0 (solid lines) representing the variation of the skeleton angle α of the inner downstream limit, the trailing edge and the outer downstream limit as a function of the height h of the blade according to the disclosure, a linearized curve R1 (mixed lines) obtained by linearizing the curve R0, a curve R2 (dashed lines) representing the variation of the air stream angle β at the inner downstream limit, of the trailing edge and the outer downstream limit according to the disclosure, a curve R3 (in continuous lines) representing the variation of the skeleton angle α at the inner downstream limit, the trailing edge and the outer downstream limit, as a function of the height h, according to the prior art, and a curve R4 (dashed lines) representing the variation of the air stream angle β at the inner downstream limit, the trailing edge and the outer downstream limit according to the prior art.

FIG. 6 illustrates a curve R0 (in continuous lines) representing the variation of the skeleton angle α of the trailing edge 12 and the inner and outer downstream limits 17, 18 at a height h of the blade 4, with reference to a concrete embodiment. FIG. 6 further illustrates a linearized curve R1 (in mixed lines) obtained by linearizing the curve R0.

The curves R0 and R1 are shown in a reference system with the x-axis corresponding to the height h of the blade 4 and the y-axis corresponding to the skeleton angle α of the inner downstream limit 18, the trailing edge 12 and the outer downstream limit 17.

According to the embodiment illustrated in the figures, the linearized curve R1 is defined by an affine function F(h) written in the form: F(h)=a*h+b, where F(h) corresponds to the skeleton angle (inner downstream limit 18, trailing edge 12 and outer downstream limit 17), a is the slope of the affine function F(h), and b is the y-intercept of the affine function F(h).

The height h is a variable between 0 and H, where H is the total height of the blade 4. The height h is expressed along the vertical stacking axis E from the inner end portion to the outer end portion 14.

As explained above, the skeleton angle α corresponds in section to the angle formed between the tangent T to the corresponding skeleton line at the point considered and the longitudinal axis X. The skeleton angle is expressed when the vane 3 is in an extreme open position.

More precisely, as shown in FIG. 6, the slope a of the affine function F(h) is positive. The y-intercept b of the affine function F(h) is also positive.

FIG. 6 also illustrates a curve R2 (dashed lines) representing the variation of the angle β of the air stream at the inner downstream limit 18, the trailing edge 12 and the outer downstream limit 17, as a function of height h, according to the disclosure. The angle β of the air stream corresponds, in a transverse plane (plane perpendicular to the vertical stacking axis E), to the angle formed between the direction defined by the air stream F and the longitudinal axis X.

FIG. 6 further illustrates a curve R3 (in continuous lines) representing the variation of the skeleton angle α at the inner downstream limit, the trailing edge and the outer downstream limit, as a function of the height h, according to the prior art.

FIG. 6 finally illustrates a curve R4 (in dashed lines) representing the variation of the angle β of the air stream at the inner downstream limit, the trailing edge and the outer downstream limit, as a function of the height h, according to the prior art.

It can be seen that the dimensioning of the blade 4 according to the disclosure significantly reduces the deviation at the end portions 14, 15 between the defined skeleton angle and the angle β of the air stream.

The skeleton angle α at a length l1 of the first chord 13 in a section of the central portion 10 is defined by a function G1((l1)). The skeleton angle α at a length l2 of the second chord 19 in a section of the outer end portion 14 is defined by a function G2(l2). The skeleton angle α at a length l3 of the third chord 29 in a section of the inner end portion is defined by a function G3(l3).

The length l1 is a variable between 0 and L1, where L1 represents the total length of the first chord 13. In other words, a length l1=0 corresponds to the leading edge 9 and a length l1=L1 corresponds to the trailing edge 12. The length l2 is a variable between 0 and L2, where L2 represents the total length of the second chord 19. In other words, a length l2=0 corresponds to the leading edge 9 and a length l2=L2 corresponds to the outer downstream limit 17. The length l3 is a variable between 0 and L3, where L3 represents the total length of the third chord 29. In other words, a length l3=0 corresponds to the leading edge 9 and a length l3=L3 corresponds to the inner downstream limit 18.

The derivative function of the function G1((l1)) with respect to the length l1 is denoted G1'((l1)). The derivative function of the function G2(l2) with respect to the length l2 is denoted G2'(l2). The derivative function of the function G3(l3) with respect to the length l3 is denoted G3'(l3).

Figure 7:
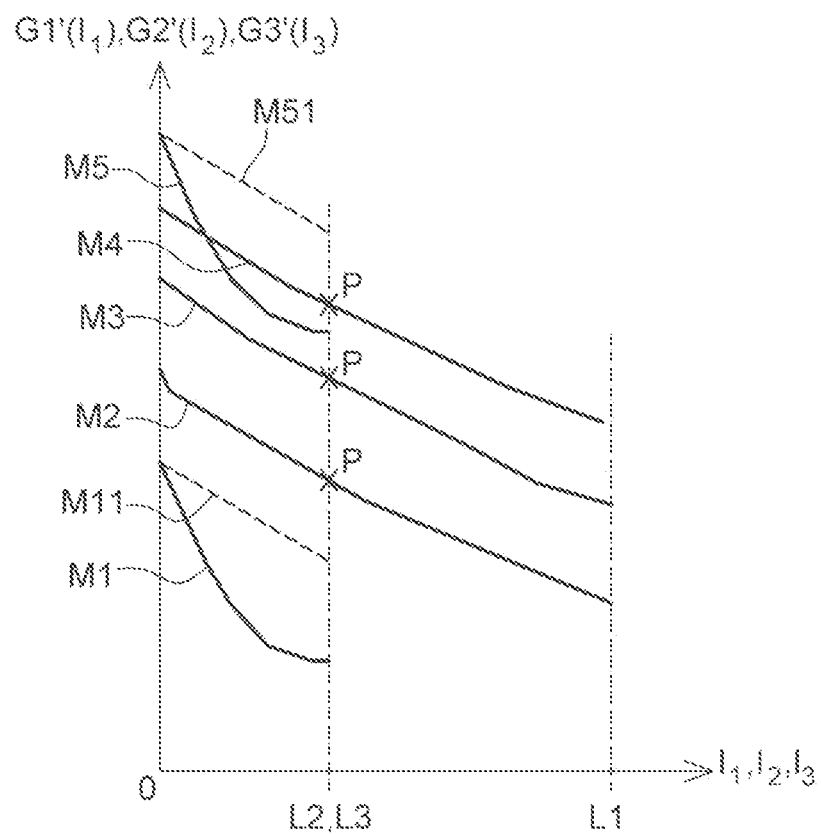
FIG. 7 is a graph illustrating the different derivative functions $G1'(l1)$, $G2'(l2)$ and $G3'(l3)$ at different heights of the blade.

FIG. 7 is a graph showing the different derivative functions G1'(l1), G2'(l2) and G3'(l3) at different heights of the blade 4. More precisely, the graph comprises the following curves:

- a curve M1 in continuous lines representing the derivative function G3'(l3) at a height equivalent to 5% of the total height H of the blade 4, according to the disclosure;
- a curve M11 in dashed lines representing the derivative function G3'(l3) at a height equivalent to 5% of the total height H of the blade, according to the prior art;
- a curve M2 in continuous lines representing the derivative function G1'(l1) at a height equivalent to 25% of the total height H of the blade 4;
- a curve M3 in continuous lines representing the derivative function G1'(l1) at a height equivalent to 50% of the total height H of the blade 4;
- a curve M4 in continuous lines representing the derivative function G1'(l1) at a height equivalent to 75% of the total height H of the blade 4;
- a curve M5 in continuous lines representing the derivative function G2'(l2) at a height equivalent to 100% of the total height H of the blade 4, according to the disclosure;
- a curve M51 in dashed lines representing the derivative function G2'(l2) at a height equivalent to 100% of the total height H of the blade, according to the prior art.

By definition, the average increment of a function f between a point A (a, f(a)) and a point B (b, f(b)) corresponds to the quotient of the difference f(b)−f(a) by the difference b−a.

A1 is the absolute value of the average increment of G1'(l1) between the leading edge 9 and a point P where the length l1 corresponds to the total length L2 of the second chord 19 or the total length L3 of the third chord 29.

A2 is the absolute value of the average increment of G2'(l2) between the leading edge 9 and the outer downstream limit 17.

A3 is the absolute value of the average increment of G3'(l3) between the leading edge 9 and the inner downstream limit 18.

As illustrated in FIG. 7, the absolute values of the average increment A2 and A3 are each greater than the absolute value of the average increment A1. This indicates that, according to the disclosure, the curvature of the end portions 14, 15 is greater than the curvature of the central portion 10.

The invention claimed is:

1. A variable-pitch stator vane for an aircraft turbine engine, said vane being streamlined with respect to a longitudinal axis (X), said vane comprising an airfoil blade extending along a vertical stacking axis (E) and having a common leading edge, said blade comprising:
   a central portion having in section a first skeleton line delimited transversely by said leading edge and a trailing edge, and a first chord connecting said leading edge to said trailing edge;
   a first end portion vertically delimiting said central portion, said first end portion having in section a second skeleton line transversely delimited by said leading edge and a first downstream limit, and a second chord connecting said leading edge to said first downstream limit, a total length (L2) of the second chord being between 40% and 80% of a total length (L1) of the first chord; and
   a first junction between said central portion and said first end portion,
   wherein a skeleton angle ($\alpha$) at a first location defined by the intersection of the first skeleton line and an orthogonal projection from the first chord at a first length l1 of the first chord in a section of said central portion is defined by a first function G1($l1$) and the skeleton angle ($\alpha$) at a second location defined by the intersection of the second skeleton line and an orthogonal projection from the second chord at a second length l2 of the second chord in a section of said first end portion is defined by a second function G2($l2$), the skeleton angle ($\alpha$) corresponding in section to an angle formed between a tangent (T) to the corresponding skeleton line at the point considered and said longitudinal axis (X), the derivative function from the function G1($l1$) with respect to the first length l1 being denoted G1' ($l1$), the derivative function from the function G2($l2$) with respect to the second length l2 being denoted G2'($l2$), the absolute value of an average increment A2 of G2'($l2$) between the leading edge and the first downstream limit is greater than the absolute value of an average increment A1 of G1'($l1$) between the leading edge and a point P where the first length l1 from the leading edge to said point P is equal to the total length (L2) of the second chord, an average increment of a function f between a point A (a, f(a)) and a point B (b, f(b)) corresponding, by definition, to the quotient of the difference f(b)−f(a) by the difference b−a.

2. The vane according to claim 1, wherein the skeleton angle ($\alpha$) at the trailing edge of the central portion in the vicinity of said first junction is equal, plus or minus degrees, to the skeleton angle ($\alpha$) of the first downstream limit of the first end portion in the vicinity of said first junction, the skeleton angle ($\alpha$) corresponding in section to an angle formed between the tangent (T) to the corresponding skeleton line at the point considered and said longitudinal axis (X).

3. The vane according to claim 2, wherein the skeleton angle ($\alpha$) at the trailing edge over a predetermined interval is equal, plus or minus five degrees, to the skeleton angle ($\alpha$) of the first downstream limit over the predetermined interval, the predetermined interval being centred on the first junction and having a vertical dimension corresponding to 5% of a total height (H) of the blade, the height of the blade being expressed along said vertical stacking axis (E).

4. The vane according to claim 1, wherein a height of the first end portion is 0.2-5% of a total height (H) of the blade, the height being expressed along said vertical stacking axis (E).

5. The vane according to claim 1, wherein said blade comprises a second end portion so that the central portion is disposed vertically between the first end portion and the second end portion, said second end portion having in section a third skeleton line delimited transversely by said leading edge and a second downstream limit, and a third chord connecting said leading edge to said second downstream limit, a total length (L3) of the third chord being between 40% and 80% of the total length (L1) of the first chord, said blade comprising a second junction between said central portion and said second end portion, a skeleton angle ($\alpha$) at the trailing edge of the central portion in the vicinity of said second junction being substantially equal to the skeleton angle ($\alpha$) of the second downstream limit of the second end portion in the vicinity of said second junction.

6. The vane according to claim 5, wherein a height of the second end portion is 0.2% to 5% of a total height (H) of the blade.

7. A compressor for an aircraft turbine engine comprising a vane according to claim 1.

8. An aircraft turbine engine comprising a compressor according to claim 7.

9. An aircraft turbine engine comprising a vane according to claim 1.

* * * * *